US010462099B2

United States Patent
Fitzgerald et al.

(10) Patent No.: US 10,462,099 B2
(45) Date of Patent: Oct. 29, 2019

(54) AUTO-ATTACH SIGNALING USED AS WIRELESS LOCAL AREA NETWORK (WLAN) SELECTION CRITERION

(71) Applicant: Extreme Networks, Inc., San Jose, CA (US)

(72) Inventors: Deborah E. Fitzgerald, Acton, MA (US); Srikanth R. Keesara, Tewksbury, MA (US)

(73) Assignee: Extreme Networks, Inc., San Jose, CA (US)

( * ) Notice: Subject to any disclaimer, the term of this patent is extended or adjusted under 35 U.S.C. 154(b) by 1 day.

(21) Appl. No.: 15/646,151

(22) Filed: Jul. 11, 2017

(65) Prior Publication Data

US 2019/0020619 A1    Jan. 17, 2019

(51) Int. Cl.
| | |
|---|---|
| H04L 29/12 | (2006.01) |
| H04L 12/46 | (2006.01) |
| H04L 12/721 | (2013.01) |
| H04W 48/16 | (2009.01) |
| H04W 60/04 | (2009.01) |
| H04L 29/06 | (2006.01) |
| H04L 29/08 | (2006.01) |

(52) U.S. Cl.
CPC ........ H04L 61/106 (2013.01); H04L 12/4633 (2013.01); H04L 12/4641 (2013.01); H04L 45/127 (2013.01); H04L 61/1588 (2013.01); H04W 48/16 (2013.01); H04W 60/04 (2013.01); H04L 67/28 (2013.01); H04L 69/24 (2013.01)

(58) Field of Classification Search
CPC ............... H04L 61/1588; H04L 45/127; H04L 12/4633; H04L 12/4641; H04W 60/04; H04W 48/16
See application file for complete search history.

(56) References Cited

U.S. PATENT DOCUMENTS

| | | | |
|---|---|---|---|
| 8,588,751 B2 | 11/2013 | Rinta-Aho et al. | |
| 2009/0168663 A1* | 7/2009 | Friskney | H04L 41/0806 370/254 |
| 2016/0080263 A1* | 3/2016 | Park | G06F 17/30345 370/392 |
| 2016/0316026 A1* | 10/2016 | Lapuh | H04L 67/16 |
| 2016/0373318 A1 | 12/2016 | Keesara et al. | |

* cited by examiner

*Primary Examiner* — Gbemileke J Onamuti
(74) *Attorney, Agent, or Firm* — Sterne, Kessler, Goldstein & Fox P.L.L.C.

(57) ABSTRACT

A method for implementing auto attach for a shortest path bridging (SPB) network comprises determining, on an access point, that an auto attach device communicating in a SPB network is enabled for auto attach, and an advertisement is transmitted to a mobile station. The access point acts a proxy between the mobile station and the auto-attach device by communicably coupling the auto attach device and the mobile station via the access point. A virtual local area network (VLAN) identification and service instance identifier (I-SID) is received from the mobile station, when is then transmitted to the auto-attach device. A VLAN (independent of any static VLAN associated with the WLAN) is created off of the VLAN identification and an indication that the I-SID and the VLAN have been accepted. Data communications are then provided between the mobile station and the auto attach device via the VLAN and the access point.

20 Claims, 5 Drawing Sheets

FIG. 2 (226, 228)

| TLV TYPE [127] | TLV LENGTH [50 OCTETS] | OUI | SUBTYPE [11] | HMAC-SHA DIGEST | ELEMENT TYPE | STATE | MGMT VLAN | RSVD | SYSTEM ID |
|---|---|---|---|---|---|---|---|---|---|
| 7 BITS | 9 BITS | 3 OCTETS | 1 OCTET | 32 OCTETS | 6 BITS | 6 BITS | 12 BITS | 1 OCTET | 10 OCTETS |

FIG. 3 (326, 330, 332)

| TLV TYPE [127] | TLV LENGTH [41-506 OCTETS] | OUI | SUBTYPE [12] | HMAC-SHA DIGEST | ASSIGNMENT STATUS | VLAN | I-SID |
|---|---|---|---|---|---|---|---|
| 7 BITS | 9 BITS | 3 OCTETS | 1 OCTET | 32 OCTETS | 4 BITS | 12 BITS | 3 OCTETS |

AUTO-ATTACH SIGNALING USED AS WIRELESS LOCAL AREA NETWORK (WLAN) SELECTION CRITERION

BACKGROUND

Various aspects of the present invention relate generally to shortest path bridging networks, and in particular to coupling an auto-attach enabled device to a shortest path bridging network.

Auto attach is a technology allows network devices (typically edge devices) to be able to leverage the features of Shortest Path Bridging (SPB). The edge devices typically can send and receive untagged packets, packets using VLAN encapsulation, or both. However, the edge devices do not have an ability to perform MAC-in-MAC encapsulation. MAC-in-MAC encapsulation uses a Service Instance Identifier (I-SID) as the primary switching transport identifier. I-SIDs have a large domain space when compared to a VLAN domain, by orders of magnitude.

BRIEF SUMMARY

According to aspects of the present invention, systems, devices, and methods for implementing auto attach for a shortest path bridging network comprises determining, on an access point, that an auto attach device (i.e., an auto-attach server) communicating in a shortest path bridging (SPB) network is enabled for auto attach. If so, an advertisement that auto attach capability is present for the SPB network is transmitted to a mobile station. A request for connection to the SPB network using auto attach is then received from the mobile station. The access point acts a proxy between the mobile station and the auto-attach device by communicably coupling the auto attach device and the mobile station via the access point. A virtual local area network (VLAN) identification and service instance identifier (I-SID) for communications with the SPB network is received from the mobile station, which is then transmitted to the auto-attach device. A VLAN (independent of any static VLAN associated with the WLAN) is created off of the VLAN identification and an indication that the I-SID and the VLAN have been accepted. Data communications are then provided between the mobile station and the auto attach device via the VLAN and the access point.

BRIEF DESCRIPTION OF THE SEVERAL VIEWS OF THE DRAWINGS

FIG. 2 is a diagram illustrating an auto-attach discovery element using an 802.11 data packet and type-length-value encoding, according to various aspects of the present disclosure;

FIG. 3 is a diagram illustrating a virtual local area network (VLAN) to service instance identifier (I-SID) assignment mapping, according to various aspects of the present disclosure;

DETAILED DESCRIPTION

According to aspects of the present disclosure, mobile stations (e.g., computers, laptops, mobile phones, tablets, stand-alone measurement devices, other devices designed to communicate wirelessly over a network, etc.) couple to a shortest path bridging (SPB) network via an access point that advertises that at least one device of the SPB network supports auto attach. Basically, an auto-attach (AA) enabled device of the SPB network sends a message to the access point, so the access point can broadcast that the SPB network supports auto attach. If the mobile station is coupled to (or includes) an auto-attach enabled client, then the mobile station will decode the broadcast from the access point and start to negotiate a coupling to the SPB network via the access point as a proxy. If the negotiations are successful, then the mobile station and the SPB network communicate via the access point.

Figure 1:
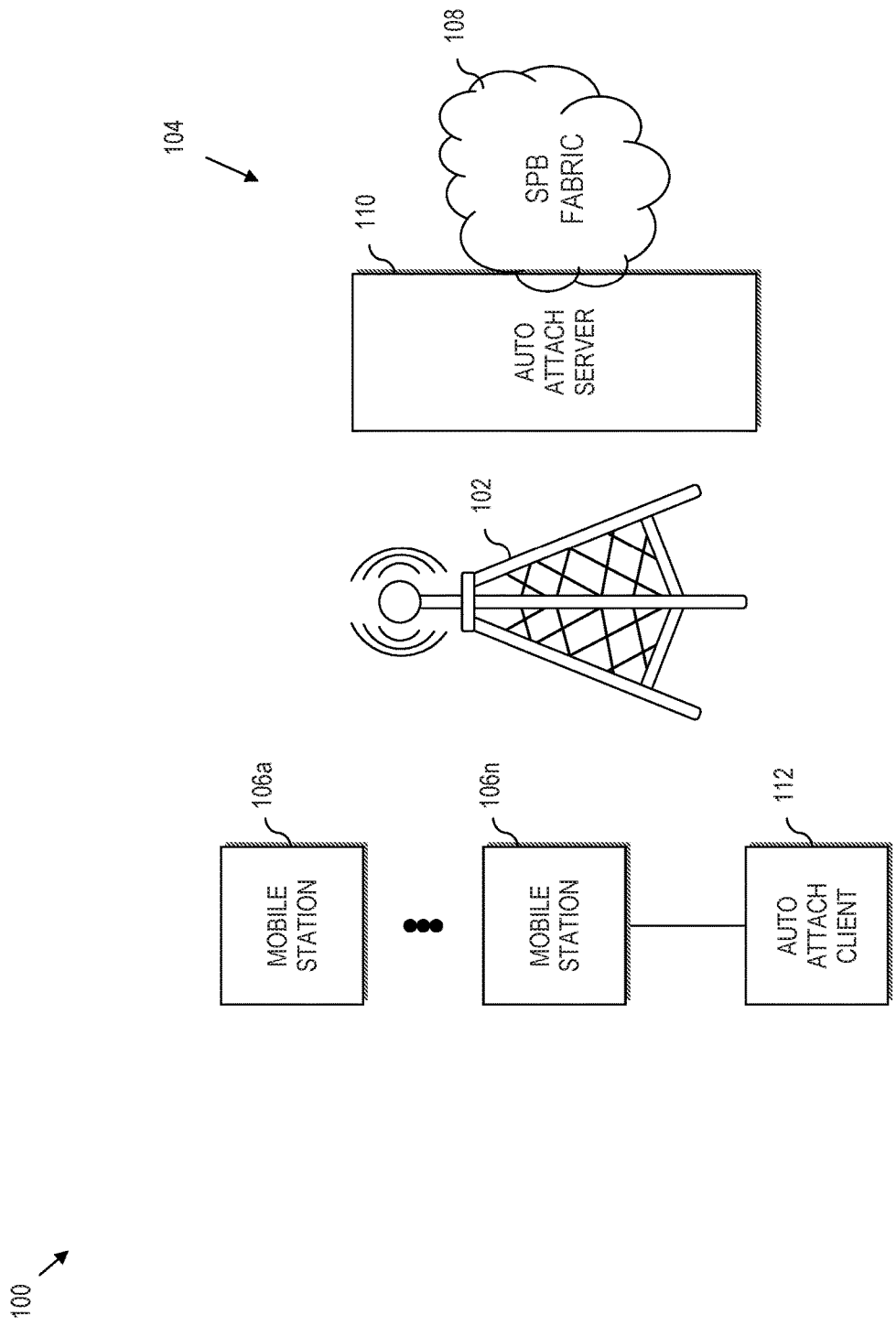
FIG. 1 is a block diagram of a system using auto-attach signaling as a criterion to select a wireless local area network (WLAN), according to various aspects of the present disclosure.

Referring to the drawings, and in particular to FIG. 1, a system 100 illustrating using auto-attach signaling as a criterion for selecting a wireless local area network (WLAN). In a typical SPB system, an access point 102 coupled to the SPB network 104 broadcasts to mobile stations 106a-n that a shortest path bridging network 104 is available. Thus, communications between the mobile stations and the access point may be wireless.

According to aspects of the present disclosure, the SPB network 104 includes not only a shortest path bridging switch fabric 108 but also a device 110 that has auto-attach signaling enabled (i.e., an auto-attach server 110). The auto-attach enabled device 110 sends an advertisement to the access point 102 to let the access point 102 know that the auto-attach enabled device 110 may allow auto-attach clients to couple to the SPB network 104. Communications between the access point and the SPB network (including the auto-attach device 110) may be wired or wireless.

Thus, the auto-attach enabled device 110 of the SPB network 104 advertises auto-attach capabilities wirelessly to the access point 102. In some embodiments, the advertisement may be sent in a wired communication in a similar manner to the examples set out above.

After learning that the device 110 is auto-attach enabled, the access point 102 sends an advertisement to the mobile stations 106a-n that auto-attach signaling may be used. This advertisement may be broadcast to the mobile stations 106a-n via a wireless transmission or a wired transmission.

The advertisement sent from the access point 102 may be in any desired form. For example, the advertisement may be sent as a beacon mechanism. Specifically, the advertisement may be a small information tag in the beacon, which may be received by the mobile station 106a-n if the mobile station 106a-n is enabled to receive such tags. Basically, a small information tag may be inserted into a beacon using type-length-value (TLV) parameters in an 802.11 data packet. If the mobile station 106a-n knows to look for such a TLV-encoded advertisement in the beacon (i.e., a device discovery message), then the mobile station 106a-n can decode the TLV-encoded advertisement. Mobile stations that are not auto-attach enabled (i.e., mobile stations not coupled to an auto-attach client) will ignore the advertisement.

FIG. 2 illustrates a TLV-encoded auto-attach discovery element 220 in an 802.11 data packet. Most spaces of the 802.11 data packet are used as they are normally used. However, a Subtype space 226 is used to indicate that the current TLV is used for auto-attach element discovery and an Element Type space 228 is used to indicate a role of the sending auto-attach device (i.e., whether the sending device is a client or server in the auto-attach scheme).

Referring back to FIG. 1, as another example, the advertisement may be in a service set identifier (SSID) associated with a wireless local area network (WLAN). The SSID is a set of thirty-two octets and is often considered a human-readable identifier of the network/device. Moreover, the SSID may be of any type: local, independent, extended, mesh, etc. The mobile station 106*a*-*n* discovers an SSID associated with the WLAN and learns that the SPB network 104 is auto-attach enabled. Thus, the SSID (which according to the present disclosure includes the auto-attach advertisement) is used to associate a WLAN to the SPB network 104 and let mobile stations know that the SPB network is enabled for auto attach communications.

Once a mobile station 106*n* coupled to an auto-attach client 112 decodes the advertisement, the mobile station 106*n* may initiate auto-attach handshaking with the SPB network 104 via the access point 102. Thus, the access point 102 may be utilized as a proxy for auto-attach handshaking. The auto-attach client 112 may be coupled to the mobile station 106*n* such that the auto-attach client 112 is remote from the mobile station 106*n* or the auto-attach client 112 may couple to the mobile station 106*n* by being integrated with the mobile station 106*n*.

The handshaking may be performed using TLV-encoded parameters in a wireless transmission, as discussed above, using a similar mapping in the 802.11 data packets. If handshaking is successful, then the mobile station 106*n* coupled to the auto-attach client sends a desired virtual LAN (VLAN) to service instance identifier (I-SID) mapping for the auto-attach server 110 to either accept or reject.

FIG. 3 illustrates a sample 802.11 data packet that may be used to send the desired VLAN-to-I-SID mapping. Again, most of the spaces within the 802.11 packet are used as they are normally used. However, the Subtype space 326 is used similarly as above. Further, a VLAN space 330 specifies a desired VLAN identification that the auto-attach client wishes to use to send data packets from the auto-attach client to the SPB network, and the I-SID space 332 specifies a desired I-SID value that the auto-attach client wishes to use in sending MAC-in-MAC packets across the SPB network.

Referring back to FIG. 1, the 802.11 packet including the requested VLAN-to-I-SID mapping is sent from the mobile station 106*n* to the access point 102, which sends the requested mapping to the auto-attach enabled device 110 (i.e., the auto-attach server). The auto-attach server 110 determines whether the VLAN may be created or used by the auto-attach client if the VLAN identification already exists. Similarly, the auto-attach server determines whether the I-SID may be created or used by the auto-attach client if the I-SID already exists. If so, then the auto-attach server 110 sends back a message to the access point 102 that the VLAN-to-I-SID mapping is accepted. If not, then the auto-attach server 110 sends back a message to the access point 102 that the VLAN-to-I-SID mapping is rejected. The access point 102 then relays the message (regardless of acceptance or rejection) to the mobile station 106*n*. Further, the access point 102 can cache requests from the mobile stations 106*a*-*n*.

Currently, wireless access points 102 have a set of predefined, static VLANs, and these are the only VLANs that are available for mobile stations to attach. However, according to the present disclosure, the mobile station 106*n* coupled to the auto-attach client may dynamically specify a VLAN on which the mobile station 106*n* wants to communicate. Thus, the VLAN may be created as needed and does not need to be one of the static, predefined VLANs associated with the access point 102. Therefore, the present disclosure allows for more flexibility when coupling to a SPB network over existing solutions.

Further, authentication of a specific domain may be performed using a well-known or a statically configured VLAN. For example, a camera domain, a healthcare domain, a guest domain, etc. would be able to use a domain-specific VLAN to exchange control information. Thus, the dynamic VLAN (as discussed above) can map to an I-SID that is used to access a specific domain (e.g., camera, healthcare, guest, etc.).

If a connection between the auto-attach server 110 and the access point 102 is lost (e.g., the auto-attach server reboots), then the access point 102 can resend the 802.11 data packet with the TLV handshaking and the 802.11 data packet with the mapping request.

Once the VLAN-to-I-SID mapping is set up, the mobile station 106*n* and SPB network 104 may start communicating data. Thus, whether a SPB network associated with an access point supports auto attach may be used as a criterion for a mobile station to determine whether the mobile station wants to connect to an access point.

Figure 4:
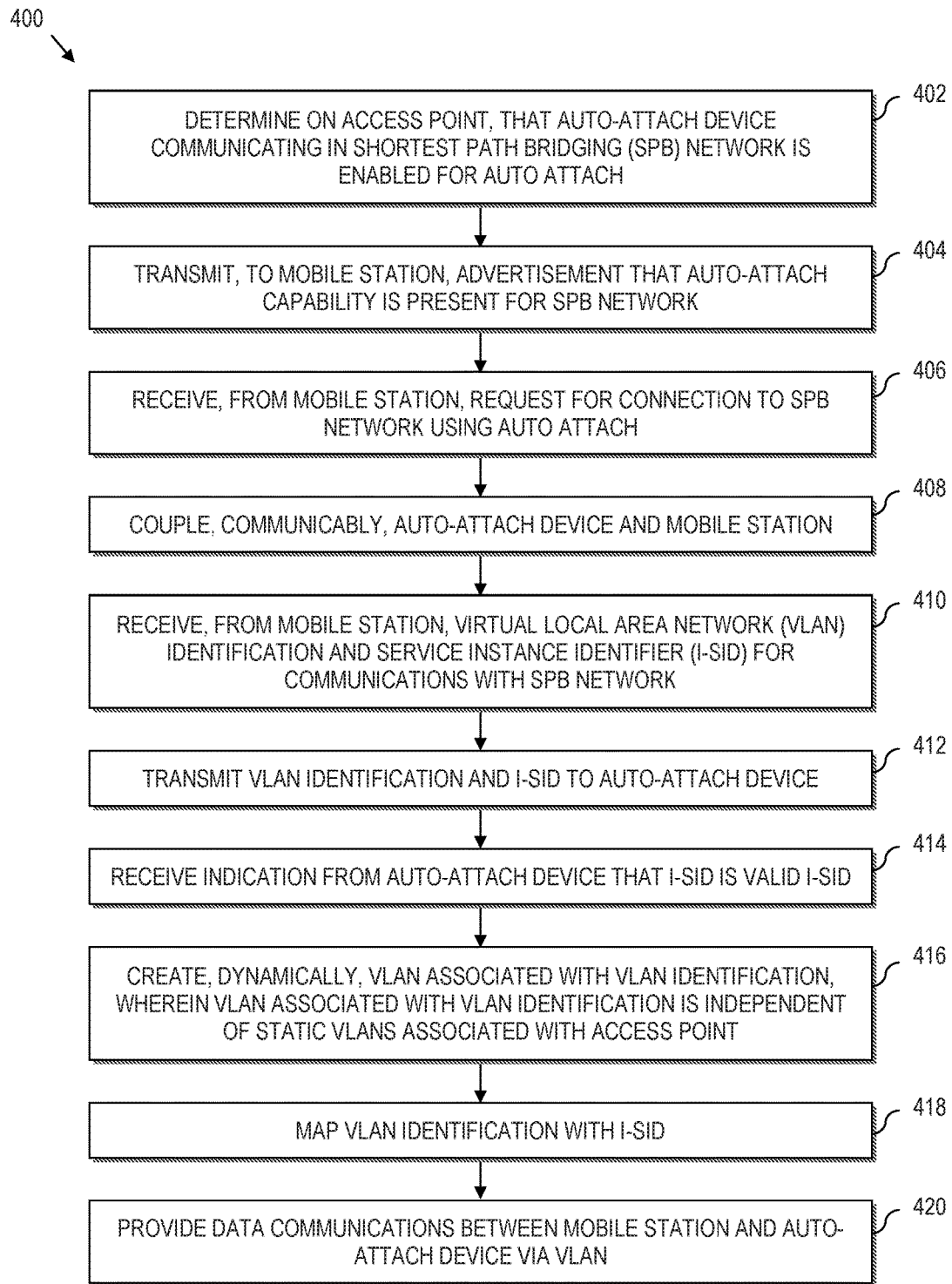
FIG. 4 is a flow chart illustrating a process for implementing auto attach for a shortest path bridging network, according to various aspects of the present disclosure.

FIG. 4 illustrates a method 400 for using auto-attach in WLAN selection. At 402, an access point determines that a device communicating in a shortest path bridging (SPB) network is enabled for auto attach. For example, the auto-attach server (110 of FIG. 1) may provide an indication to the access point that auto-attach server is auto-attach enabled, as discussed above.

At 404, the access point transmits an indication that the SPB network supports auto attach to at least one mobile station. The indication may be performed using any of the ways discussed above. For example, the indication may be an advertisement as a small information tag within a beacon, as discussed above. As another example, the indication may be embedded in an SSID associated with the SPB network.

At 406, a request for connection using auto attach is received from the mobile station. The mobile station may include an auto-attach client or the mobile station may be coupled to the auto-attach client, yet be remote from the auto-attach client. In other words, the auto-attach client may be part of the mobile station or may be separate from the mobile station. As discussed above, the request may be an 802.11 data packet with TLV-embedded parameters.

At 408, the mobile station and the auto-attach enabled device are communicably coupled. The access point acts as a proxy for auto attach such that any preliminary handshaking between the mobile device and the auto-attach server goes through the access point. In some embodiments, the handshaking is performed using TLV embedded in 802.11 data packets as described above.

At 410, a VLAN identification and an I-SID is received from the mobile station. The VLAN identification and I-SID may be received in an 802.11 packet as described above.

At 412, the VLAN identification and I-SID is transmitted to the auto-attach device of the SPB network. Again, the VLAN identification and I-SID may be transmitted in an 802.11 packet as described above.

At 414, an indication of whether the I-SID and VLAN identification are accepted or rejected is received from the auto-attach device of the SPB network.

At 416, a VLAN associated with the VLAN identification is dynamically created. Thus, the created VLAN is not a static, predefined VLAN. In other words, the VLAN associated with the VLAN identification is independent of static VLANs associated with the access point/auto-attach device. In some embodiments, the creation of the VLAN occurs before the indication of whether the I-SID and VLAN identification are accepted or rejected is received. In various embodiments, creating the VLAN is done by determining that the auto-attach device created the VLAN.

At 418, the VLAN identification is mapped to the I-SID. This may be performed by the access point, the auto-attach device, or both.

At 420, data communications is provided between the mobile station and the auto-attach device via the VLAN and the access point. Thus, the access point acts as an auto-attach proxy.

As described herein, a single access point may serve as a proxy for multiple mobile stations and auto-attach devices of the SPB network. Therefore, the access point may accept several requests for VLAN-to-I-SID mappings, as described herein. If there are several mapping requests to be sent to the same auto-attach server, the access point may aggregate several mapping requests and periodically send them to the auto-attach device of the SPB network.

Figure 5:
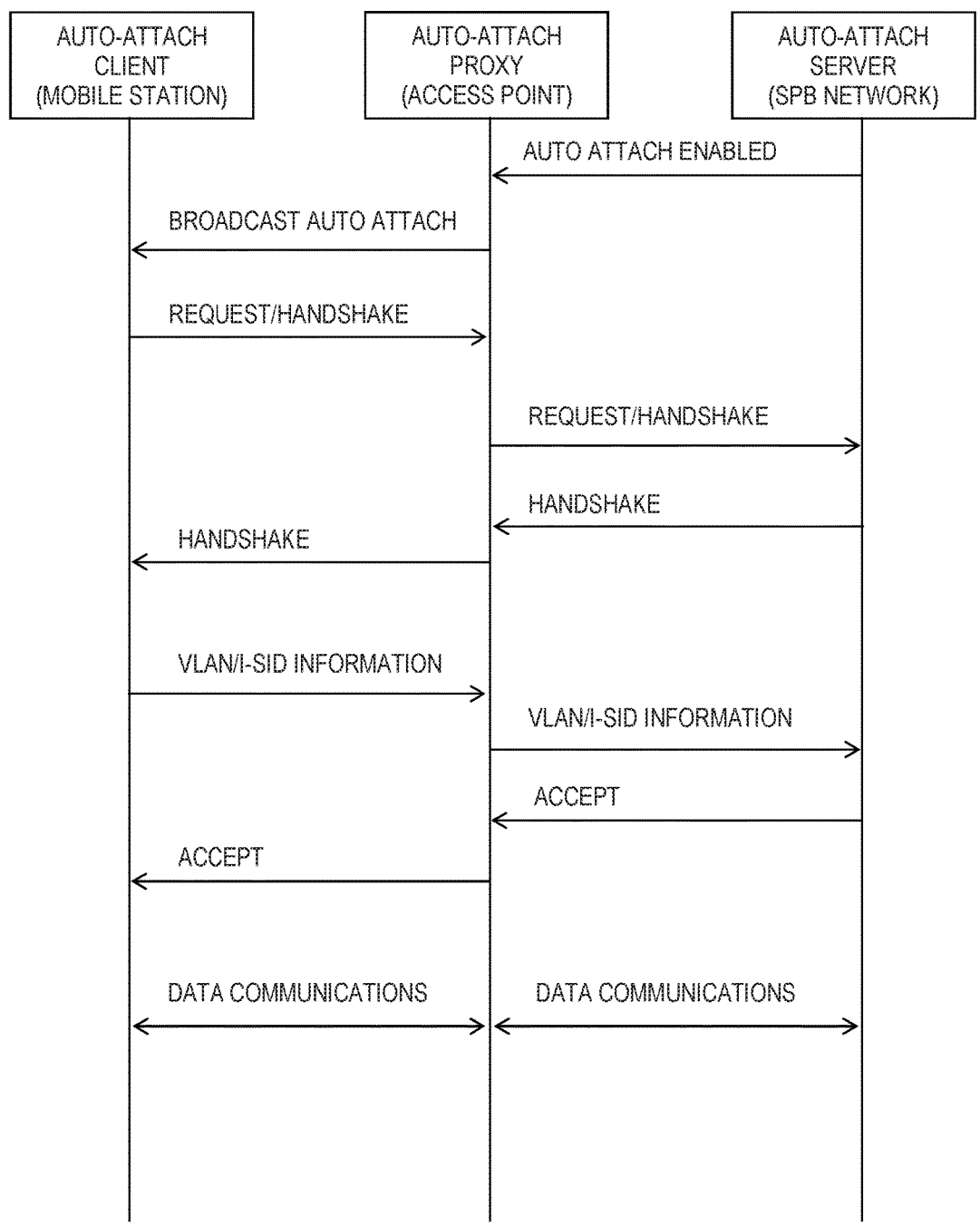
FIG. 5 is a second flow chart illustrating the process for implementing auto attach for a shortest path bridging network, according to various aspects of the present disclosure.

FIG. 5 is a timing flow chart illustrating an example embodiment of a process for using auto-attach in WLAN selection that illustrates communications between entities in a system as described in FIG. 1. The entities include a mobile station, an access point, and an auto-attach server within a shortest path bridging network.

The auto-attach server sends an indication to the access point that indicates that the SPB network includes auto-attach capabilities. The access point broadcasts the auto-attach capabilities to mobile stations, as described above.

A mobile station requests connection to the SPB network using auto-attach signaling. The request is sent to the auto-attach server, and handshaking commences, using the access point as a proxy. The handshaking is described in greater detail above.

Once handshaking has finished, the mobile station sends to the access point VLAN and I-SID information that the mobile station requests to use for communications. The access point sends the VLAN and I-SID information. If the auto-attach server accepts the VLAN and I-SID information, then an indication of that acceptance is sent to the access point, which passes the acceptance to the mobile station (i.e., auto-attach client). At that point, auto attach has been performed, and the mobile station can communicate with the SPB network via the VLAN and the access point. If the VLAN and/or I-SID was rejected, then the mobile station may request a different VLAN and/or I-SID or just not connect to the SPB network.

Figure 6:
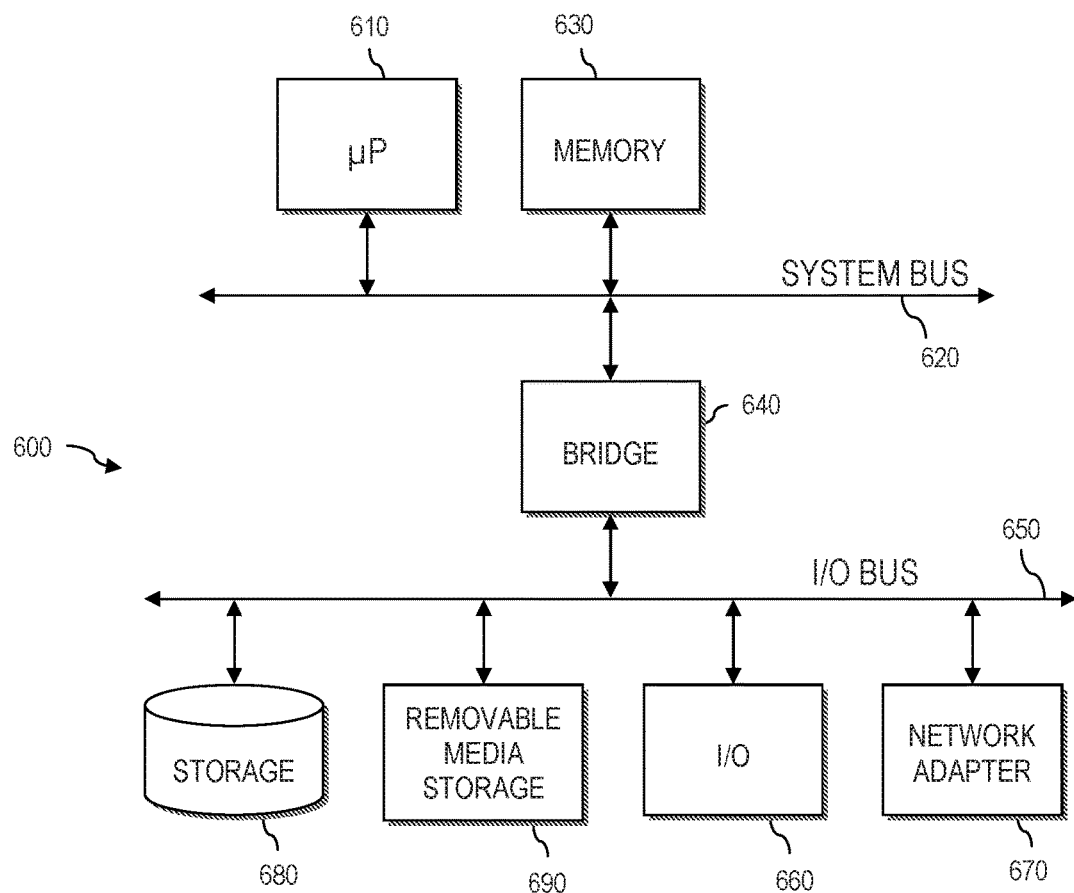
FIG. 6 is a block diagram of a computer system having a computer readable storage medium for implementing functions according to various aspects of the present disclosure as described in greater detail herein.

Referring to FIG. 6, a block diagram of a data processing system is depicted in accordance with the present invention. Data processing system 600 may comprise a symmetric multiprocessor (SMP) system or other configuration including a plurality of processors 610 connected to system bus 620. Alternatively, a single processor 610 may be employed. Also connected to system bus 620 is memory an interface to local memory 630. An I/O bus bridge 640 is connected to the system bus 620 and provides an interface to an I/O bus 650. The I/O bus may be utilized to support one or more buses and corresponding devices such as bus bridges, input output devices 660 (I/O devices), storage, network adapters, etc. Network adapters 670 may also be coupled to the system to enable the data processing system to become coupled to other data processing systems or remote printers or storage devices through intervening private or public networks.

Also connected to the I/O bus may be devices such as a graphics adapter, storage 680 and a removable media storage 690. Any of the memory (storage 680, removable media storage 690, etc.) may have computer usable program code embodied thereon. The computer usable program code may be executed to implement any aspect of the present invention, for example, to implement any aspect of any of the methods and/or system components illustrated in FIGS. 1-5.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer storage medium does not include propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Network using an Network Service Provider).

Aspects of the present disclosure are described herein with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. A method for implementing auto attach for a shortest path bridging (SPB) network, the method comprising:
   determining, on an access point, that an auto attach device communicating in the SPB network is enabled for the auto attach;
   transmitting, to a mobile station, an advertisement that auto attach capability is present for the SPB network;
   receiving, from the mobile station, a request for connection to the SPB network using the auto attach;
   coupling, communicably, the auto attach device and the mobile station;
   receiving, from the mobile station, a virtual local area network (VLAN) identification and service instance identifier (I-SID) for communications with the SPB network;
   transmitting the VLAN identification and I-SID to the auto attach device;
   receiving an indication from the auto attach device that the I-SID is a valid I-SID;
   creating, dynamically, a VLAN associated with the VLAN identification, wherein the VLAN associated with the VLAN identification is independent of static VLANs associated with the access point;
   mapping the VLAN identification with the I-SID; and
   providing data communications between the mobile station and the auto attach device via the VLAN.

2. The method of claim 1, wherein transmitting, to a mobile station, an advertisement that auto attach capability is present for the SPB network further comprises:
   transmitting, via a small information tag in a beacon, an advertisement that the SPB network is enabled for auto attach.

3. The method of claim 1, wherein transmitting, to a mobile station, an advertisement that auto attach capability is present for the SPB network further comprises:
   transmitting, via a service set identifier (SSID) associated with the SPB network that the SPB network is enabled for auto attach.

4. The method of claim 1, wherein transmitting, to a mobile station, an advertisement that auto attach capability is present for the SPB network comprises broadcasting an advertisement that auto attach capability is present for the SPB network.

5. The method of claim 1, wherein receiving, from the mobile station, a request for connection to the SPB network using the auto attach comprises receiving, from the mobile station that includes an auto attach client, a request for connection to the SPB network using the auto attach.

6. The method of claim 1, wherein receiving, from the mobile station, a request for connection to the SPB network using the auto attach comprises receiving, from the mobile station that is remote from an auto attach client, a request for connection to the SPB network using the auto attach.

7. The method of claim 1, wherein receiving, from the mobile station, a request for connection to the SPB network using the auto attach comprises receiving, from the mobile station, a type-length-value (TLV) element embedded in 802.11 wireless data packets.

8. The method of claim 7 further comprising:
transmitting the TLV element to the auto attach device;
wherein coupling, communicably, the auto attach device and the mobile station comprises performing handshaking between the auto attach device and the mobile station through the access point using 802.11 data packets.

9. The method of claim 1, wherein mapping the VLAN identification with the I-SID comprises receiving an indication that the VLAN and I-SID mapping has been accepted by the auto-attach-enabled device.

10. The method of claim 1, wherein providing data communications between the mobile station and the auto attach device via the VLAN comprises passing data communications between the mobile station and the auto attach device through the access point.

11. The method of claim 1, wherein creating a VLAN comprises receiving an indication from the auto-attach enabled device that a VLAN with the requested VLAN identification has been created.

12. A device for implementing auto attach for a shortest path (SPB) bridging network, the device comprising an access point comprising a processor coupled to a memory with a program for implementing auto attach for a shortest path bridging network, wherein the program instructs the processor to perform:
determining, on an access point, that an auto attach device communicating in the SPB network is enabled for the auto attach;
transmitting, to a mobile station, an advertisement that auto attach capability is present for the SPB network;
receiving, from the mobile station, a request for connection to the SPB network using the auto attach;
coupling, communicably, the auto attach device and the mobile station;
receiving, from the mobile station, a virtual local area network (VLAN) identification and service instance identifier (I-SID) for communications with the SPB network;
transmitting the VLAN identification and I-SID to the auto attach device;
receiving an indication from the auto attach device that the I-SID is a valid I-SID;
creating, dynamically, a VLAN associated with the VLAN identification, wherein the VLAN associated with the VLAN identification is independent of static VLANs associated with the access point;
mapping the VLAN identification with the I-SID; and
providing data communications between the mobile station and the auto attach device via the VLAN.

13. The method of claim 12, wherein transmitting, to a mobile station, an advertisement that auto attach capability is present for the SPB network further comprises:
transmitting, via a small information tag in a beacon, an advertisement that the SPB network is enabled for auto attach.

14. The device of claim 12, wherein transmitting, to a mobile station, an advertisement that auto attach capability is present for the SPB network further comprises:
transmitting, via a service set identifier (SSID) associated with the SPB network that the SPB network is enabled for auto attach.

15. The device of claim 12, wherein transmitting, to a mobile station, an indication that auto attach capability is present for the SPB network comprises broadcasting an indication that auto attach capability is present for the SPB network.

16. The device of claim 12, wherein receiving, from the mobile station, a request for connection to the SPB network using the auto attach comprises receiving, from the mobile station, a type-length-value (TLV) element embedded in wireless data packets.

17. The device of claim 16 further comprising:
transmitting the TLV element to the auto attach device;
wherein coupling, communicably, the auto attach device and the mobile station comprises performing handshaking between the auto attach device and the mobile station through the access point.

18. The device of claim 12, wherein mapping the VLAN identification with the I-SID comprises receiving an indication that the VLAN and I-SID mapping has been accepted by the auto-attach-enabled device.

19. The device of claim 12, wherein providing data communications between the mobile station and the auto attach device via the VLAN comprises passing data communications between the mobile station and the auto attach device through the access point.

20. The device of claim 12, wherein creating a VLAN comprises receiving an indication from the auto-attach enabled device that a VLAN with the requested VLAN identification has been created.

* * * * *